United States Patent [19]

Rosán, Sr. et al.

[11] 3,983,598
[45] Oct. 5, 1976

[54] SELF-BORING BUSHING DEVICE

[75] Inventors: José Rosán, Sr., San Juan Capistrano; Marvin P. Reece, Dana Point, both of Calif.

[73] Assignee: Rosán Hydraulics, Inc., Newport Beach, Calif.

[22] Filed: Oct. 14, 1975

[21] Appl. No.: 621,641

[52] U.S. Cl. .................................. 16/3; 217/113; 408/204; 285/40
[51] Int. Cl.² ...................... B65D 7/48; H02G 3/04
[58] Field of Search ............. 16/2, 3; 408/204, 207, 408/215; 403/201; 285/40, 201, 197; 85/32.1, 68; 174/152 G, 167; 217/113; 29/432

[56] References Cited
UNITED STATES PATENTS
3,349,792  10/1967  Larkin ............................ 285/40

FOREIGN PATENTS OR APPLICATIONS
222,515  4/1958  Australia .......................... 285/197
464,620  12/1968  Switzerland ....................... 285/197

Primary Examiner—Andrew V. Kundrat

[57] ABSTRACT

A self-boring bushing device adapted to provide passage through a structure, such as a wall, wherein the device is so constructed as to both thread and bore itself therein upon rotation thereof, thus providing communication between both sides of the wall, whereby electrical conduits or lead-in wires can be received therethrough, the device comprising a stud-like body having an enlarged head formed to receive a tool for rotating the stud and an elongated shank portion provided with external threads, and wherein the terminating end of the shank includes a plurality of boring teeth extending outwardly therefrom forming the annular free end of the stud-like body, the body being formed with an elongated, longitudinal bore wherein various elements can be passed therethrough, sealing plugs being also included to be positioned within each opposite, open end thereof.

2 Claims, 5 Drawing Figures

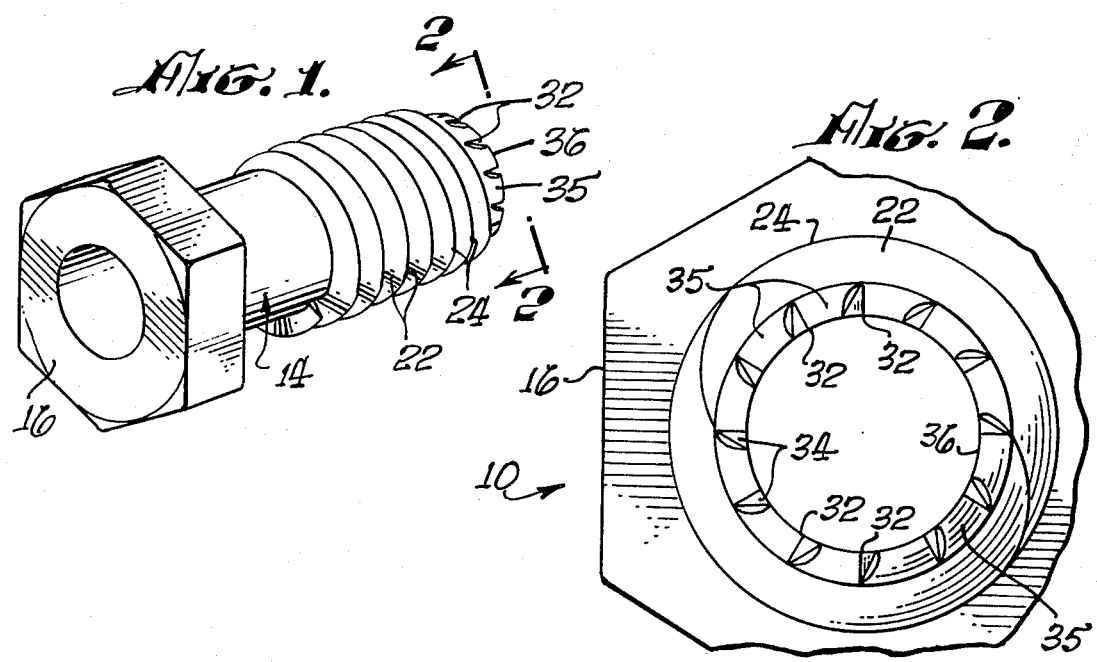
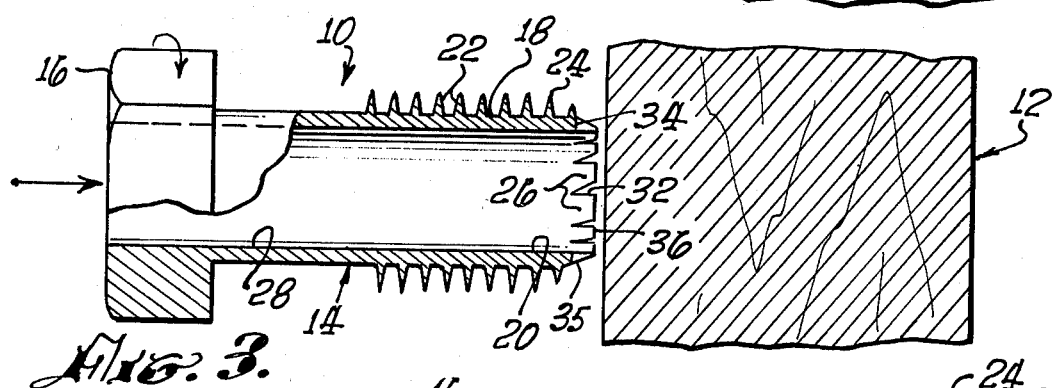
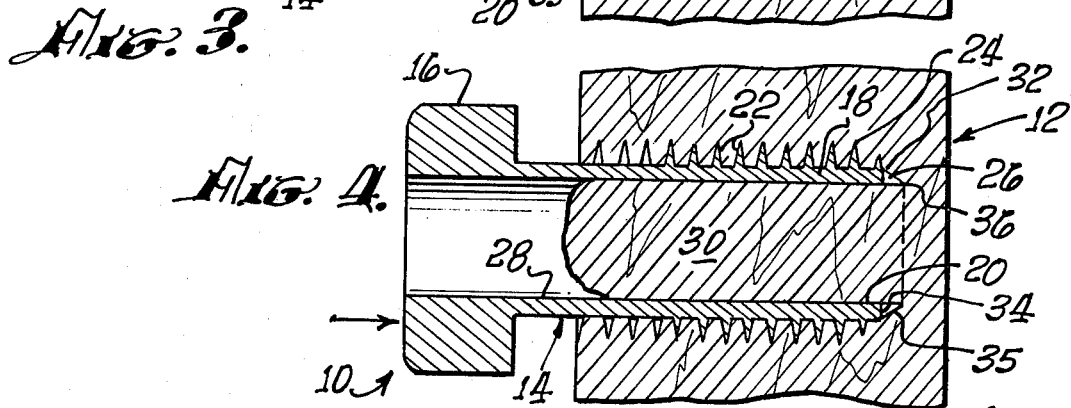
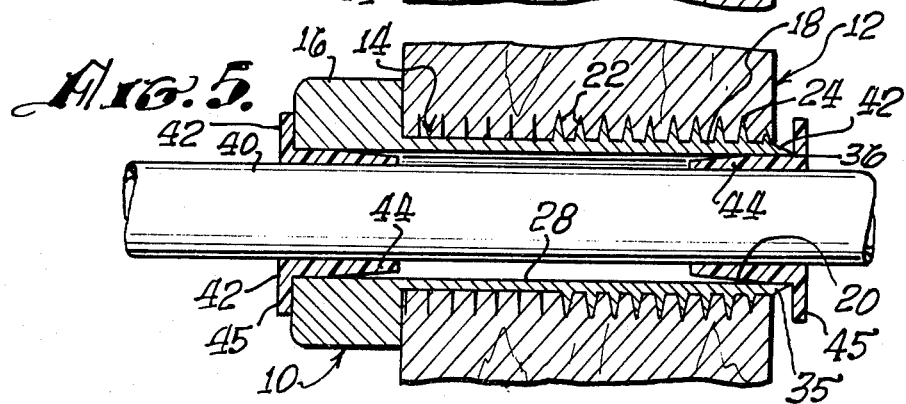

SELF-BORING BUSHING DEVICE

BACKGROUND OF THE INVENTION

1. Field of the Invention

This invention relates generally to bushing devices and relates more particularly to a self-boring bushing device that is threaded directly into a wall structure, thus providing a communicating passage between each side of the structure.

2. Description of the Prior Art

Various auxiliary bushing devices have been proposed for use in providing a communicating passage through different types of structures. However, as is well known in the art, many problems and difficulties are encountered in providing a suitable means for allowing conduits to be passed from one side of a structure to another, particularly with respect to electrical conduits, lead-in wires, and cables.

Generally, entrance bushings are designed for specific purposes and cannot be used for a wide range of installations.

As an example of the various designs and uses that have been disclosed, the following are presented of interest thereto.

U.S. Pat. No. 3,666,878 has disclosed an entrance bushing for an electric treater subject to high voltage, temperature, and pressure-operating conditions. Thus, it is very limited in its use. In addition, special tools are needed to mount this device.

U.S. Pat. No. 1,956,869 illustrates another type of device used to permit passage of an electrical conductor. However, no means are provided wherein the connection is capable of forming its own bore through the accommodating structure in which it is to be mounted.

A conductivity cell is disclosed in U.S. Pat. No. 2,939,070. Here, again, the device is restricted in use and also is not provided with features wherein the body of the device can form its own mounting bore.

Also of interest in the area of bushing fixtures and seals, are U.S. Pat. Nos. 3,322,890 and 3,728,584, but neither provides a self-tapping screw or bolt for use in the general construction industry as a stuffing box, a lead-in, or a conduit fitting.

SUMMARY OF THE INVENTION

The present invention comprises a self-boring bushing device defined by a stud-like body formed with an elongated, central bore therethrough. This device is designed to provide its own mounted, self-threaded bore within the wall structure to which the device is mounted. Accordingly, the stud-like body includes an enlarged, multi-sided head adapted to be received in a socket wrench or some other suitable tool, wherein the body is rotated in a screw-type operation. That is, formed integrally with the head is a shank portion, which is provided with external threads, the threads being formed with a continuous, fine-cutting edge so as to be easily received within the wall structure, which generally consists of a wood or wood product, but not limited thereto.

A plurality of boring or cutting teeth are formed as an integral part of the terminating, annular end of the shank portion, wherein each tooth projects outwardly therefrom, forming the entrance to the elongated bore. This, as the stud-like body is threaded into the structure, the boring teeth proceed to cut a smooth bore therein, at which time a plug is formed by the material being bored. Once the bushing is threaded to its maximum position, that being where the bushing has passed completely through the wall structire, the plug is forced from the bore of the bushing. This then allows various electrical conduits and the like to be received through the wall structure.

When required, a pair of end seals are positioned in each open end of the bushing as an aid in providing protection to the various components that can be used therewith.

OBJECTS AND ADVANTAGES OF THE INVENTION

The present invention has for an important object a provision wherein a passage for communicating through a structure, particularly a wall, can be simply formed by a self-boring bushing — without the need for special operating tools.

It is another object of the invention to provide a self-boring bushing that includes external threads formed with a continuous, knife-like cutting edge.

It is still another object of the invention to provide a self-boring bushing wherein the boring, cutting teeth are formed as an integral part thereof.

It is a further object of the present invention to provide a self-boring bushing that can — once installed — be adapted to receive various components therethrough other than electrical conduits and cables.

It is still a further object of the invention to provide a device of this character that is relatively inexpensive to manufacture.

Still another object of the invention is to provide a device of this character that is simple and rugged in construction.

It is still a further object of the invention to provide a device of this character that can be used in the construction industry as a stuffing box, a lead-in, or a conduit fitting.

The characteristics and advantages of the invention are further sufficiently referred to in connection with the accompanying drawings, which represent one embodiment. After considering this example, skilled persons will understand that variations may be made without departing from the principals disclosed and we contemplate the employment of any structures, arrangements or modes of operation that are probably within the scope of the appended claims.

DESCRIPTION OF THE DRAWINGS

Referring more particularly to the accompanying drawings, which are for illustrative purposes only:

FIG. 1 is a perspective view of the present invention;

FIG. 2 is an enlarged end view as seen along line 2—2 of FIG. 1;

FIG. 3 is a partial, longitudinal, sectional view of the self-boring bushing device positioned adjacent a wall structure;

FIG. 4 is a longitudinal, sectional view thereof as it would be seen boring through the wall structure; and FIG. 5 is a longitudinal, sectional view with the bushing being completely received through the structure, and having a member passing therethrough and sealed therein.

DESCRIPTION OF THE PREFERRED EMBODIMENT

Referring more particularly to the accompanying drawings, there is shown a self-boring bushing device, generally indicated at 10, said device being designed to cut and bore into and through a structure, which is indicated generally at 12. Most often, the structure will comprise a wall constructed of wood or wood-like material adapted to be bored therein.

There are many instances in the construction industry where various pipes, conduits, wires, and so on, are needed to be passed through walls. Thus, to accommodate such a need, the present invention has been provided wherein the self-boring bushing 10 comprises a stud-like body 14 having a multi-sided head 16, herein shown as having a hexagonal configuration. Thus, any suitable wrench or wrench socket can be accommodated thereby.

Integrally formed with the head 16 is an extended cylindrical shank portion 18 which terminates at one end thereof with an opening 20. The shank portion 18 is provided with external threads 22, wherein the threads are formed with a very sharp pitch which provides a continuous, knife-cutting edge 24. The knife-cutting edge 24 thus provides a means by which the stud is forced to be received into the structure such as 12. Since no pre-drilled hole is required, the threads must be screwed into the wall or partition in a manner which is most simple and as easy as possible. Thus, the threads — by having a continuous knife edge — allow the shank to be rotated in a clockwise direction, without the usual requirement of first providing a pre-drilled hole.

Together with the threads 22, there are formed a plurality of boring or cutting teeth 26 that project longitudinally outward from the annular, terminating end of the shank 18 formed by opening 20 therein. The opening thereof also forms the entrance to the elongated, cylindrical passage 28. Said passage 28 provides a two-fold purpose — the means by which a core 30 is cut from the wall during the process of screwing the bushing into the wall 12 — thereby allowing said core to freely enter and be received within said cylindrical bore 28. This is shown in FIG. 4. Thus, it can be seen that, as the shank 18 is embedded within the wall in a progressively forward manner, core 30 is formed and passes within bore 28.

Accordingly, when the bushing 10 penetrates completely through the wall 12 as seen in FIG. 5, the core is completely severed and is then easily removed from passage 28. This can be accomplished by simply inserting a screw driver or a like took and forcing the core out of passage 28.

Before describing the second use thereof, a more detailed description should be made as to the boring or cutting teeth 26. With 26, as can be seen in the drawing, are positioned co-axially about the longitudinal axis of cylindrical passage 28. Each tooth is provided with a cutting edge 32 created by a plurality of V-shaped slots 34 in combination with the inwardly-inclined, annular surface 35. The inclined surface also provides a leading, apexed, boring edge 36. This boring edge 36 initially creates an advanced kerf formed as the self-boring bushing is screwed inwardly.

Thus, the cutting edges 32 of the teeth 26 and the leading boring edges thereof, together with the specially designed threads 22 all combine to provide a simple process for completely boring through wood structures.

Relating back to the second means provided by the bore 28, the bore — once cleared of core 30 — allows for various components to be positioned therein for communication between each side of the wall in which the bushing is mounted.

As an example, there is shown in FIG. 5 the self-boring bushing device 10 being positioned completely through wall 12, wherein a conduit 40, which represents any suitable component as previously mentioned, is disposed within the bushing 10. Included within this arrangement, there is a sealing means in the form of sealing plugs 42 which are force-fitted within the open ends of the bushing device 10. Each sealing plug comprises a cylindrical body 44 adapted to snugly fit about the conduit 40, one end of the body being tapered so as to be readily received in the bushing openings, wherein the opposite end thereof is provided with an annular flange 45. Hence, it can be seen that the wall 12 is sealed on both sides and the conduit is held in a substantially firm position, without the aid of other components.

The invention and its attendant advantages will be understood from the foregoing description and it will be apparent that various changes may be made in form, construction and arrangement of the parts of the invention without departing from the spirit and scope thereof or sacrificing its material advantages, the arrangement hereinbefore described being merely the way of example, and we do not wish to be restricted to the specific form shown or uses mentioned except as defined in the accompanying claims.

We claim:

1. A self-boring bushing device to provide a passage through a wall structure, without the use of a predrilled hole, or supporting means, wherein various cables and conduits are received and positioned therethrough, said device comprising:

a stud-like body having a multi-sided head member and an elongated, tubular shank member formed as an integral part thereof, wherein a longitudinal passage is disposed therein;

external threads formed along the shank member, said threads having a continuous cutting edge thereon; and a plurality of boring teeth juxtapositioned co-axially about the passage opening and extending outwardly from said shank member, whereby said teeth forms a bore through said wall structure when said bushing device is screwed directly inwardly by means of said cutting threads, and said multi-sided head defines a wrench head, and each of said boring teeth includes a leading, apexed, boring edge formed along the outer edge of each tooth and a lateral cutting edge disposed in a normal manner thereto, said edges creating an annular kerf within the structure, thereby forming a core which is continuously received within said passage as said device is rotated; and wherein said core is readily removed therefrom to allow communication between each side of said wall structure, whereby said cables and conduits can pass therethrough, and including sealing means positioned within each open end of said passage and arranged to receive said conduits and cables under a sealed condition between each side of said structure.

2. A self-boring bushing device as recited in claim 1, wherein said sealing means comprise a pair of sealing plugs defined by a cylindrical body having one end thereof tapered to be received in said passage, the opposite end thereof being formed with an annular flange.

* * * * *